United States Patent [19]
Kick et al.

[11] 4,343,633
[45] Aug. 10, 1982

[54] HIGH PRESSURE PURIFICATION OF HYDROGEN

[75] Inventors: Helmut Kick; Hans Kistenmacher; Walter Schramm; Berndt Hoerner; Udo Lang, all of Munich, Fed. Rep. of Germany

[73] Assignee: Linde Aktiengesellschaft, Wiesbaden, Fed. Rep. of Germany

[21] Appl. No.: 209,619

[22] Filed: Nov. 24, 1980

[30] Foreign Application Priority Data

Nov. 23, 1979 [DE]  Fed. Rep. of Germany ....... 2947239
Dec. 24, 1979 [DE]  Fed. Rep. of Germany ....... 2952347

[51] Int. Cl.³ .............................................. F25J 3/00
[52] U.S. Cl. ......................................... 62/23; 62/28; 62/41
[58] Field of Search ....................................... 62/23-38

[56] References Cited

U.S. PATENT DOCUMENTS

| | | | |
|---|---|---|---|
| 3,062,015 | 11/1962 | Cost | 62/23 |
| 3,373,574 | 3/1968 | Fisher | 62/23 |
| 3,691,779 | 9/1972 | Meisler et al. | 62/23 |
| 4,217,759 | 8/1980 | Shenoy | 62/23 |
| 4,256,476 | 3/1981 | Baush | 62/23 |

Primary Examiner—Norman Yudkoff
Attorney, Agent, or Firm—Millen & White

[57] ABSTRACT

In the purification of a hydrogen stream contaminated with at least methane and ethane, e.g. a hydrogen cycle gas from a coal hydrogenation process, where the hydrogen stream is subjected to multistage partial condensation and separation of the respectively formed condensates, the improvement of subjecting the hydrogen stream under a pressure of above about 100 bar to the multistage partial condensation and separation of having in the final condensate 5-40 molar percent of ethane, thereby favorably altering the K-value of methane and its ease of removal from the hydrogen which is only altered in the manner desired when the process is conducted under pressures in excess of about 100 bar.

18 Claims, 6 Drawing Figures

HIGH PRESSURE PURIFICATION OF HYDROGEN

BACKGROUND OF THE INVENTION

This invention relates to an improved process for the purification of a hydrogen stream by low temperature multistage partial condensation of impurities. The contaminants include methane, ethane, and in some cases heavier hydrocarbons as well as inert gases, and the process of the invention is conducted under pressures of above 100 bar.

In the conventional condensation process, the gas to be purified is cooled to condense out the heavier components which are then removed stepwise in separators. At the end of the cooling step the gaseous stream contains only light components of a specific purity depending on the initial gas composition and the final temperature.

The number and arrangement of the selected separators depends on the type of raw gas being purified as well as by two criteria. On the one hand, it is essential to separate heavy components before they reach the freezing point so as to prevent fouling of the flow passages, and, on the other hand, from an energy viewpoint, there is to be avoided the cooling of relatively large amounts of condensed out liquid to lower temperatures and the reheating of same after their separation.

Therefore, it is conventional in the purification of a hydrogen stream containing light hydrocarbons to arrange the separators in such a way that almost all of the $C_2$-hydrocarbons can be separated with the next-to-last condensate. For this purpose, using a $C_2$-refrigerant, a temperature is required of about $-100°$ C. In the subsequent final condensation stage, a condensate is then obtained which is essentially methane.

SUMMARY OF THE INVENTION

An object of this invention is to provide a process of the type mentioned hereinabove which is particularly amenable to high pressure operations i.e. above 100 bar of pressure.

A further object is to provide a process yielding high hydrogen purities and safely avoiding solids precipitation at low temperatures.

Upon further study of the specification and appended claims, other objects and advantages of this invention will become apparent to those skilled in the art.

These objects are surprisingly attained by the provision that a significant quantity of ethane is contained in the last condensate, in addition to methane.

In one embodiment of the process of this invention, the condensate separation stages are arranged so as to maintain between the last and next-to-last separators an unusually large temperature difference. Contrary to one of the aforementioned prior art design criteria, a condensate is formed at a relatively high temperature, is further cooled, and then is reheated after separation.

The basis of the present invention is the discovery of an unusual equilibrium behavior of hydrogen contaminated with methane and ethane under very high pressures, i.e. under pressures of above about 100 bar. The extent of separation of higher-boiling components from a gaseous stream, meaning in this specific case thus the separation of light hydrocarbons from hydrogen, is determined largely by the equilibrium behavior of the mixture of substances. An important parameter here is the K-value, indicating the equilibrium ratio of the concentration of a single substance in the gaseous phase to its concentration in the liquid phase. The K-value depends not only on the composition of the mixture of substances, but also on the pressure and on the temperature.

If no intermediate separation is performed when separating methane, ethane and even heavier components over a relatively large temperature range in the cooling step upstream of the coldest separator, then those components which have condensed out at warmer temperatures are entrained into the coldest separator. Thus, the concentration of methane in the condensate of the coldest separator is reduced and simultaneously its K-value. Consequently, there should be a lower concentration of methane in the gaseous phase, but it has been known that the presence of ethane and perhaps further components in the condensate disadvantageously affects the K-value of methane. For this reason, the separators in the conventional methods are arranged in such a way that the last condensate is extensively free of heavier components, i.e. a methane liquid containing not more than about 0.01 mol % of ethane.

It has now been found surprisingly that, under pressures of above 100 bar, the effect of ethane on the K-value of methane is altered. For, if one examines the dependency of the K-value on the pressure at varying ethane contents, then it can be found that, as shown qualitatively in FIG. 1, the lines representing a constant ratio of methane to ethane in the condensate not only approach each other above 100 bar, but in some areas they even overlap each other. The approaching of the lines signifies that the K-value of methane is no longer as greatly impaired in this zone by the presence of ethane, while an overlapping of the lines demonstrates an improvement of the K-value when ethane is present in the condensate.

In the performance of the process of this invention, it has been found advantageous for the ethane content in the final condensate to range between 5 and 40 mol %, especially between 10 and 30 mol %, the remainder being methane and other impurities. The most favorable ethane content depends essentially on the selected process pressure. In some practical cases, this content may be initially restricted by the ethane content in the hydrogen stream to be purified, since the amount of ethane contained in the raw gas may be too small for setting the most favorable ethane concentration in the final condensate. In such cases, the next to last separator can be arranged in many cases so as to merely ensure that components precipitating as solids at the lowest temperature therein are condensed out to such an extent that residual amounts will remain soluble in liquid condensate as the temperature is lowered in the final condenser. Thus, the condensate from the final condenser can contain not only ethane in 5-40 molar %, but also up to about 0.5 molar % of $C_3$-hydrocarbons.

Conversely, in other cases, to maintain a sufficiently high ethane proportion in the final condensate, the next-to-last condensate separation must be effected at relatively high temperatures of between about $-60°$ and $-80°$ C. For in many cases, such a quantity of $C_4$- and $C_5$-hydrocarbons is still contained in the remaining gas that solids precipitation can occur during further cooling and the aforementioned version of this process becomes infeasible. Moreover, in said version, high hydrogen purities of, for example, above 98% can only be attained under particularly favorable starting conditions.

Accordingly, in a second embodiment of the present invention, the ethane content in the final condensate is attained by admixing to the hydrogen stream, after condensation and separation of the components boiling higher than $C_2$-hydrocarbons, a stream which contains $C_2$-hydrocarbons.

The advantage of this version of the process as compared with the first version arises from the fact that there is no longer any interdependency of the concentration of the $C_2$-hydrocarbons in the final condensation stage on the content of the $C_2$-hydrocarbons in the hydrogen stream to be purified. Thereby, because these two variables are now independent, it is possible, on the one hand, to effect the penultimate condensate separation at a temperature at which the higher-boiling components are condensed out to such a degree that their solubility limit is no longer reached during further cooling, and therefore precipitation of solids can be excluded. On the other hand, quite independent of the respectively existing composition of the contaminated hydrogen stream, the most advantageous process conditions can be attained by a suitable choice of the quantity of ethane stream admixed thereto, whereby a desired purity can be achieved, again substantially independent of the composition of the contaminated hydrogen stream.

It has been discovered that the improved purifying effect is attained not only with the addition of $C_2$-hydrocarbons to methane, but also in other systems. Thus, methane, $C_2$ or $C_3$-hydrocarbons exert a comparable effect on low-boiling accompanying components, for example on nitrogen or carbon monoxide. Also, whereas $C_3$-hydrocarbons have an effect, it was found that the addition of $C_2$-hydrocarbons yields a greater condensation of accompanying compounds, such as nitrogen, carbon monoxide or methane, than the $C_3$-hydrocarbons. Although the addition of methane leads to even further improved results in connection with the separation of nitrogen and carbon monoxide, it results, on the other hand, in increased methane contents in the purified hydrogen stream so that, overall, the hydrogen purity is impaired.

Thus, to exploit the purifying effect of an admixed methane stream, a two-stage procedure is proposed in a special embodiment of the process of this invention. In this procedure, a stream consisting essentially of methane is admixed in order to achieve a maximal separation of nitrogen and carbon monoxide, i.e., two components occurring in many cases of application as the major contaminants. After the addition of the methane-rich stream, the condensates are cooled and separated, there remaining a gaseous stream of hydrogen which contains still a relatively large amount of methane. This gaseous stream is then mixed, according to the invention, with a further stream, this one containing essentially $C_2$-hydrocarbons. The gaseous stream can, if necessary, first be heated in a heat exchanger or alternatively can be partially reheated by adding a stream containing $C_2$-hydrocarbons and having a suitable temperature. The mixture, now depleted of components such as nitrogen and carbon monoxide, is recooled, in which case the admixed $C_2$-hydrocarbon-containing stream now ensures the extensive condensation of the methane contained in the hydrogen stream. After a renewed separation of condensate, a hydrogen stream of an especially high purity is thus obtained; in particular hydrogen purities of above 98% can be attained, wherein this high purity is almost independent of the composition of the initial contaminated hydrogen stream.

The process of this invention is effective even with the addition of relatively small streams of $C_2$-hydrocarbons. The quantity of the admixed streams can range between 1 and 10 mol-% of the hydrogen stream; for example, good results are obtained with admixtures of between 3% and 8%. In contrast thereto, by adding amounts of substantially more than 10 mol-% of the hydrogen stream, the result is not only an enlargement of the components of the plant, but also only a very minor additional improvement of hydrogen purity.

It is also advantageous to cool the hydrogen stream initially to temperatures of between about 170 K and 200 K and to separate thus-formed condensates, and then to perform the admixture of the stream containing $C_2$-hydrocarbons and/or of the stream containing essentially methane. With such a precooling of the hydrogen stream, it is not only possible to separate all components tending toward solid precipitation in the low-temperature section to a sufficient extent, but on the other hand it is also still possible to maintain this temperature by a relatively simple refrigeration cycle.

In a preferred embodiment of the process of this invention, a recycle stream is admixed to the hydrogen stream. For this purpose, the admixed stream, obtained together with the impurities to be separated from the hydrogen stream in the condensate of the final condensation stage, is separated from the condensate by means of rectification. The rectifying column required for fractionation of the condensate is necessary anyway in many cases of application, for example in process for hydrogen purification within the framework of coal hydrogenation, inasmuch as the components contained in the condensate and boiling higher then methane, i.e., essentially $C_2$- and $C_3$-hydrocarbons, are generally separated for economical reasons from the lighter components which are to be utilized, for example, as merely heating gas. For this reason, only relatively minor additional measures are necessary to provide the cycle.

The rectifying processing of the condensate separated at a low temperature can moreover be conducted, in an advantageous further development of the process, together with a heavier fraction separated at a higher temperature, in order to lower the total cost for the processing of the separated condensates. For this purpose it is possible, for example, to feed into the same rectifying column, besides the condensate separated at the maximally low temperature, also the condensate separated from the hydrogen stream prior to admixture of the cycle stream thereto.

In conducting the process of this invention, besides methane and $C_2$-hydrocarbons in the final condensate, a relatively high proportion, e.g., 10 to 22 molar percent based on the methane, of separated light components is obtained in the final condensate, such as, for example, nitrogen and carbon monoxide, as well as hydrogen dissolved in the condensate. For this reason, a low boiling gaseous product is formed during rectification of the condensate, this product containing a relatively high proportion of light components, such as hydrogen, nitrogen, and carbon monoxide. To attain satisfactory separation, it is thus necessary either to reduce the head temperature or to raise the pressure of the rectifying column, both cases entailing increased expenditures. To avoid such expensive expediencies, another embodiment of the process of this invention provides that the condensate obtained at the maximally low temperature is initially expanded before it is fed into the rectifying column. Thereby the largest part of the dissolved hydrogen, nitrogen, and carbon monoxide is degasified from the condensate. This gaseous proportion is then introduced into the product stream withdrawn from the head of the rectifying column, thus circumventing this column. Thereby, with the same head temperature, the required column pressure is lowered considerably.

The process of this invention is especially suitable in the purification of a hydrogen stream obtained under a pressure of between 200 and 300 bar. Such high pressures are encountered, for example, in the hydrogen cycle of a coal hydrogenation process.

BRIEF DESCRIPTION OF THE DRAWINGS

FIG. 2 shows an embodiment of the first-described version of the process of this invention;

FIGS. 3-6 show embodiments of the second version of the process according to this invention, to wit:

FIG. 3 is a simple embodiment of the process of this invention;

FIG. 4 is another embodiment wherein the condensate obtained at the lowest temperature is subjected to intermediate expansion;

FIG. 5 shows another embodiment wherein the separated condensates are worked up in only one rectifying column; and FIG. 6 shows another embodiment wherein purification is performed by admixing two streams.

DETAILED DESCRIPTION OF THE DRAWINGS

In a coal hydrogenation process, a pumpable mixture of coal and oil is reacted in the presence of hydrogen under a high pressure, for example at 250 bar, under suitable reaction conditions with the formation of liquid and gaseous hydrocarbons. Subsequently, desired process products such as heating oil or gasoline fractions are separated by cooling and condensation from the products which, at the process temperature, i.e., at temperatures of between about 400° and 480° C., are in the gaseous phase. The proportion of the uncondensed gaseous products at ambient temperature is comprised substantially of excess hydrogen and a number of lighter hydrocarbons, as well as possibly present low-boiling accompanying substances, e.g. nitrogen, carbon oxides, argon, steam and, under certain circumstances, also minor amounts of oxygen. The hydrogen is recycled into the hydrogenation stage, wherein merely the proportion consumed by hydrogenation is replaced by fresh hydrogen. Since the contaminating substances contained in the cycle hydrogen either take part themselves in undesired reactions upon being recycled into the hydrogenation reactor or at least would lead to a load on the cycle and on the hydrogenation reactor, these components are separated by the condensation process of this invention.

Figure 1:
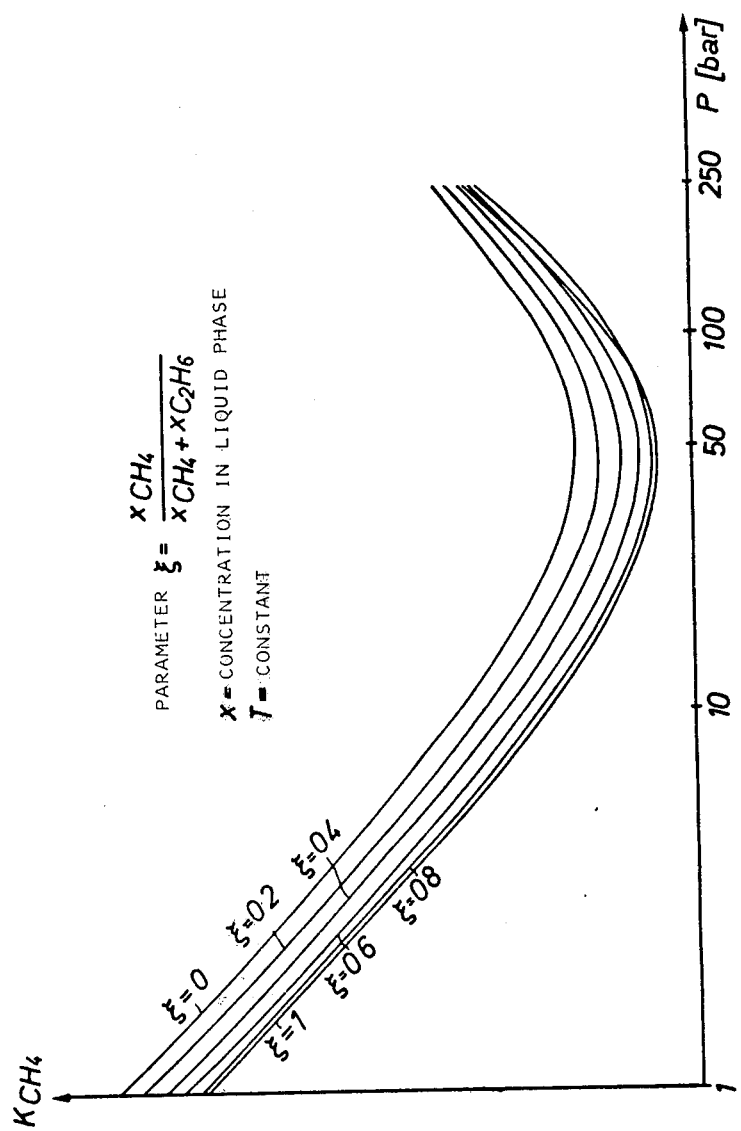
FIG. 1, previously discussed, is a graph showing the effect of pressure and ethane concentration on the K-value of methane.
Figure 2:
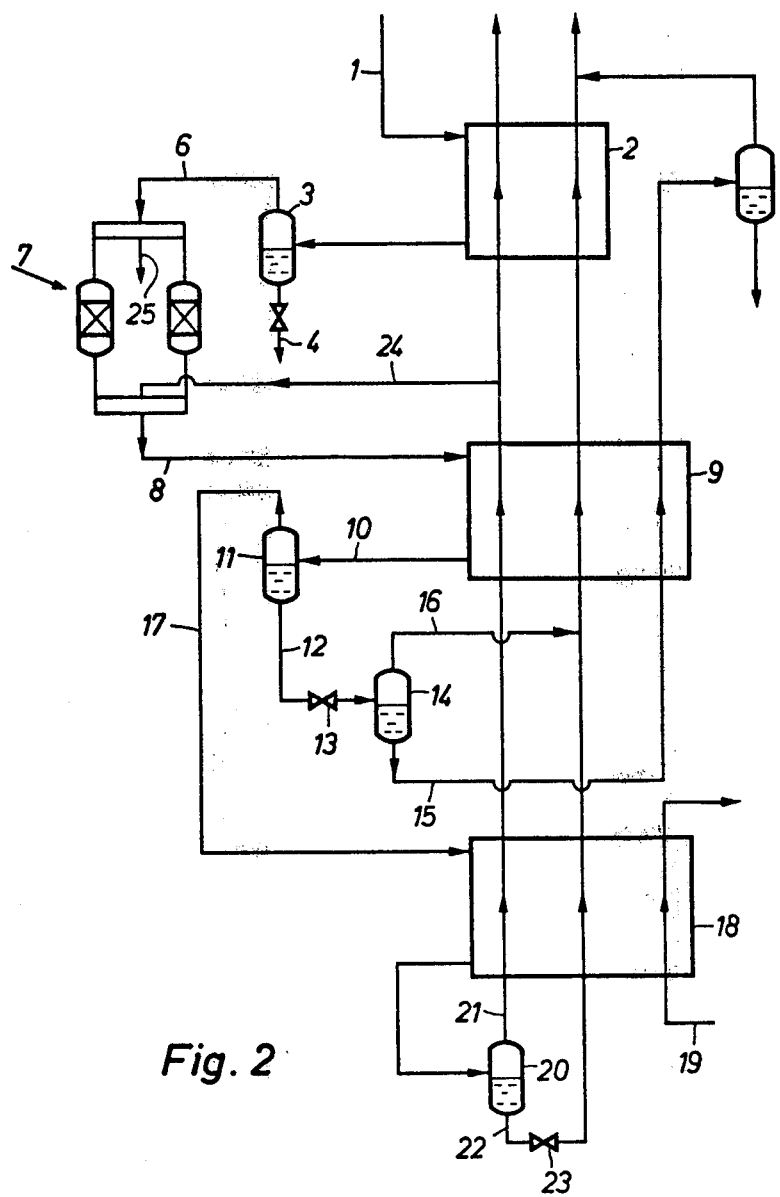
FIGS. 2-6 are schematic illustrations of preferred embodiments of the invention for purifying recycle hydrogen from a coal hydrogenation plant, specifically.

In the embodiment illustrated in FIG. 2, the cycle gas is introduced via conduit 1 into a first heat exchanger 2 wherein it is cooled to about 10° C. The thus-obtained condensate is withdrawn in the subsequent separator 3 via conduit 4, while the components which have remained in the gaseous phase are passed on via conduit 6 first of all to a purifying system consisting of several, periodically operated adsorbers 7, where they are freed of entrained contaminants, especially hydrogen sulfide. Thereafter, the gas, containing 91.23 mol-% hydrogen, 5.31 mol-% methane, 1.32 mol-% ethane, 1.14 mol-% propane, 0.34 mol-% butane, 0.05 mol-% $C_{5+}$-hydrocarbons and 0.61 mol-% inert gases (argon, nitrogen, carbon monoxide), is fed via conduit 8 into a further heat exchanger 9 wherein it is cooled to $-60°$ C. against cold fractionation products. Then the partially condensed mixture is introduced via conduit 10 into the phase separator 11. The condensate separated therein contains the largest portion of higher-boiling components of the gaseous stream. The condensate consists of 11 mol-% ethane, 41.8 mol-% propane, 19.3 mol-% butane, 2.9 mol-% $C_{5+}$-hydrocarbons, and 0.4 mol-% inert compounds. After the separating step, the condensate is withdrawn via conduit 12, expanded in valve 13 and thereafter separated in phase separator 14 from the flash gases liberated during expansion. While the condensate, consisting essentially of propane, is withdrawn via conduit 15 and reheated in heat exchanger 9, the flash gases containing essentially the light components are withdrawn separately via conduit 16 and combined with the condensate which has been separated in the last condensation stage and already has been partially reheated.

The components of the hydrogen stream not condensed in heat exchanger 9 are withdrawn from phase separator 11 via conduit 17 and fed to a third heat exchanger 18 wherein cooling takes place against process products as well as against external cold, for example against refrigerant evaporating in conduit 19 and derived from a refrigeration cycle. This cooling is performed to the temperature at which the desired hydrogen purity is attained. In the present example, this temperature is 92 K, whereby a gaseous fraction is produced in phase separator 20 which consists of 97.47 mol-% hydrogen and is only contaminated by 2.00 mol-% methane and 0.53 mol-% inert components. This purified recycle hydrogen is withdrawn via conduit 21, reheated in heat exchangers 18, 9 and 2 against the gaseous stream to be purified, and then discharged from the part of the plant here under consideration. The condensate in phase separator 20 contains 5.9 mol-% hydrogen, 62.4 mol-% methane, 19.9 mol-% ethane, 9.2 mol-% propane, 0.8 mol-% butane, and 1.8 mol-% inert substances. It is withdrawn via conduit 22, expanded in valve 23, heated in heat exchanger 18, thereupon combined with the flash gases from separator 14, and further heated in heat exchangers 9 and 2, before being withdrawn from the part of the plant here considered. This gas can be used, for example as heating gas or also as feed for steam reforming to produce the process hydrogen.

A partial stream 24 of the purified hydrogen fraction is withdrawn, after being heated in heat exchangers 18 and 9, and used for regenerating the adsorbers 7 operating in the desorption phase. The regenerating gas, loaded with the separated impurities, is discharged via conduit 25.

Figure 3:
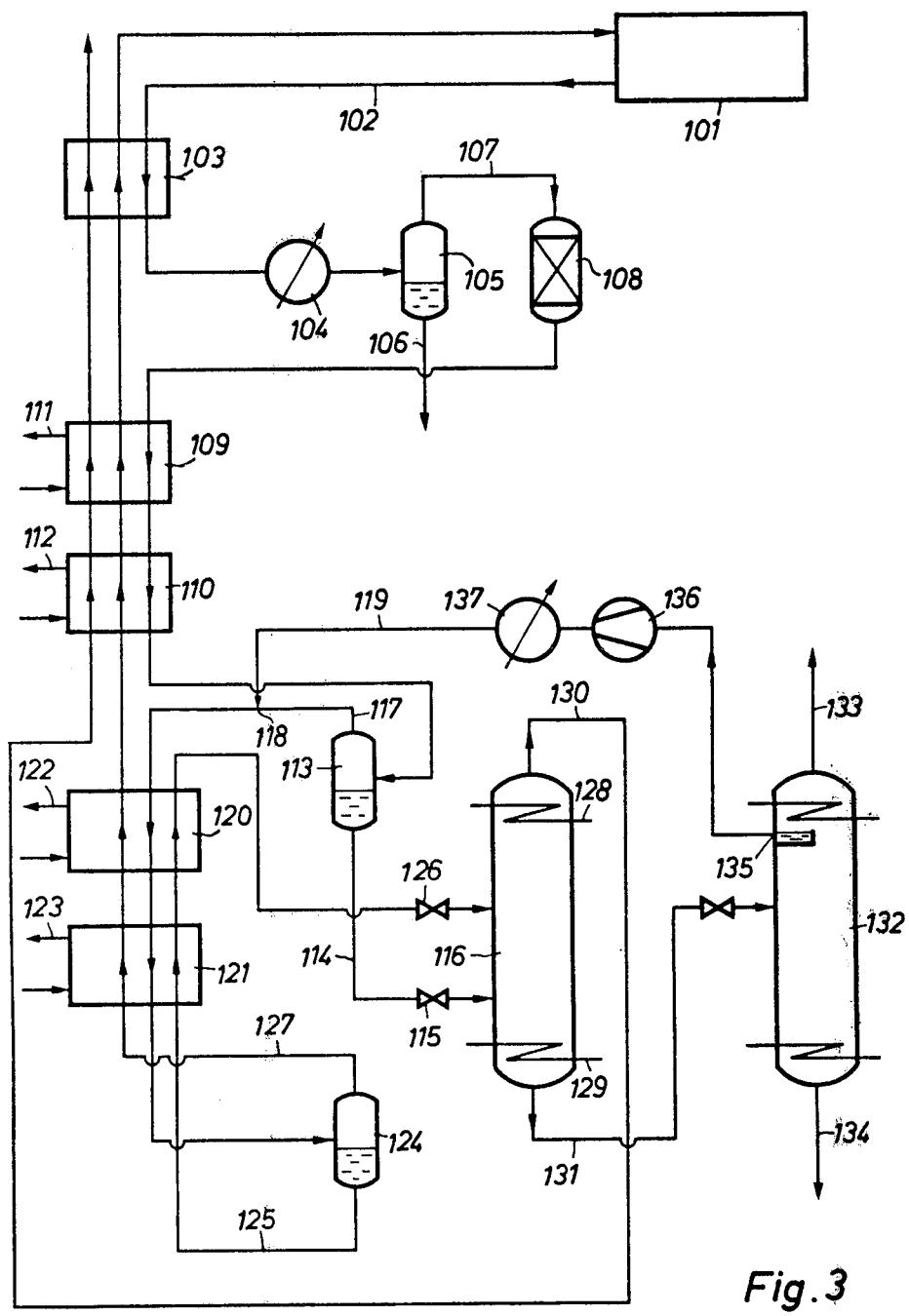

In the embodiment of the process of this invention illustrated in FIG. 3, the contaminated hydrogen stream is withdrawn via conduit 102 from a coal hydrogenation stage denoted by reference numeral 101 and is initially cooled in heat exchanger 103 against fractionation products, thereupon cooled in cooler 104 against a coolant, for example a $C_3$-coolant, to a temperature of about 5° C. and then fed into a first phase separator 105. Here the components condensed at this temperature, essentially $C_{3+}$-hydrocarbons and water, are withdrawn via conduit 106. The components which have remained in the gaseous phase are then conducted via conduit 107 into a dryer 108 and thereafter further cooled in heat exchangers 109 and 110 against fractionation streams to be warmed as well as against evaporating refrigerant in conduits 111 and 112. With the use of a $C_2$-coolant evaporating under atmospheric pressure, a temperature of about $-100°$ C. is attained in heat exchanger 110. In the phase separator 113, the condensed components are then separated. The condensate is withdrawn via conduit 114, expanded to the pressure of the rectifying column 116 in valve 115, and fed into the lower zone of this rectifying column.

The components not condensed in separator 113 are withdrawn via conduit 117. At 118, a stream consisting essentially of ethane and fed via conduit 119 is admixed to this hydrogen stream. The mixture is then further cooled in heat exchangers 120 and 121 against methane and nitrogen as refrigerants, evaporating in conduits 122 and 123, respectively, as well as against fractionation products to be warmed, and fed into the phase separator 124 at a temperature of about $-181°$ C. The condensate obtained at this temperature, lying slightly above the freezing point for methane, contains besides the largest portion of the methane from the contaminated hydrogen stream also the ethane admixed at 118 as well as, in accordance with the respective equilibrium behavior, lower-boiling impurities, such as nitrogen, carbon monoxide, and in some cases argon or oxygen. The concentration of these last-mentioned components is substantially increased by the admixture of the ethane at 118.

The condensate from separator 124 is withdrawn via conduit 125, partially reheated in heat exchangers 121 and 120 and then, after expansion in valve 126, fed into the rectifying column 116. The gaseous fraction from separator 124 represents the purified hydrogen; this fraction is withdrawn via conduit 127, heated in heat exchangers 121, 120, 110, 109 and 103, and recycled into the hydrogenation stage 101.

In the rectifying column 116, operated under pressures of, for example, 30-35 bar, the condensates from separators 113 and 124 are fractionated. By selecting appropriate rectifying conditions and with the use of a heat condenser 128 as well as a reboiler 129, a head product is thus obtained and withdrawn via conduit 130 which contains methane and lower-boiling components. This fraction, after being heated in heat exchangers 110, 109 and 103, is discharged as a methane-rich mixture under a pressure of about 30 bar and can be used, for example, as fuel gas. In the sump of the rectifying column 116, a $C_{2+}$-fraction is obtained which is withdrawn via conduit 131 and fed into a further rectifying column 132. In this second rectifying column 132, separation takes place into an ethane fraction withdrawn overhead and discharged via conduit 133, and which can, for example, be fed to a stream reformer to produce in this way part of the hydrogen required for the hydrogenation stage 101, or which can also be utilized as feed for a cracking stage for olefin production. The sump product withdrawn via conduit 134 contains $C_3$-hydrocarbons and higher-boiling components. This fraction can, for example, likewise be fed to a steam reformer.

The rectifying column 132 moreover comprises a tap 135 arranged in the upper zone. Here ethane is discharged in the liquid phase and, after pressure elevation in pump 136 as well as subsequent cooling in cooler 137 to about $-100°$ C., is conducted via conduit 119 to the hydrogen stream to be purified and mixed therewith at 118.

In a specific embodiment according to FIG. 3, a contaminated hydrogen stream was used containing (after having left drier 108), in addition to 88.82 mol-% hydrogen, also 4.61 mol-% methane, 2.86 mol-5 $C_{2+}$-hydrocarbons, and 3.71 mol-% inert compounds (essentially nitrogen and carbon monoxide). Via conduit 119, 8% ethane was added to the gaseous fraction from separator 113, whereby, after cooling to $-181°$ C. in separator 124, a purified hydrogen stream was obtained which contained, besides 96.65 mol-% hydrogen, only 3.17 mol-% inert components, 0.17 mol-% methane, and 0.01 mol-% $C_{2+}$-hydrocarbons.

Figure 4:
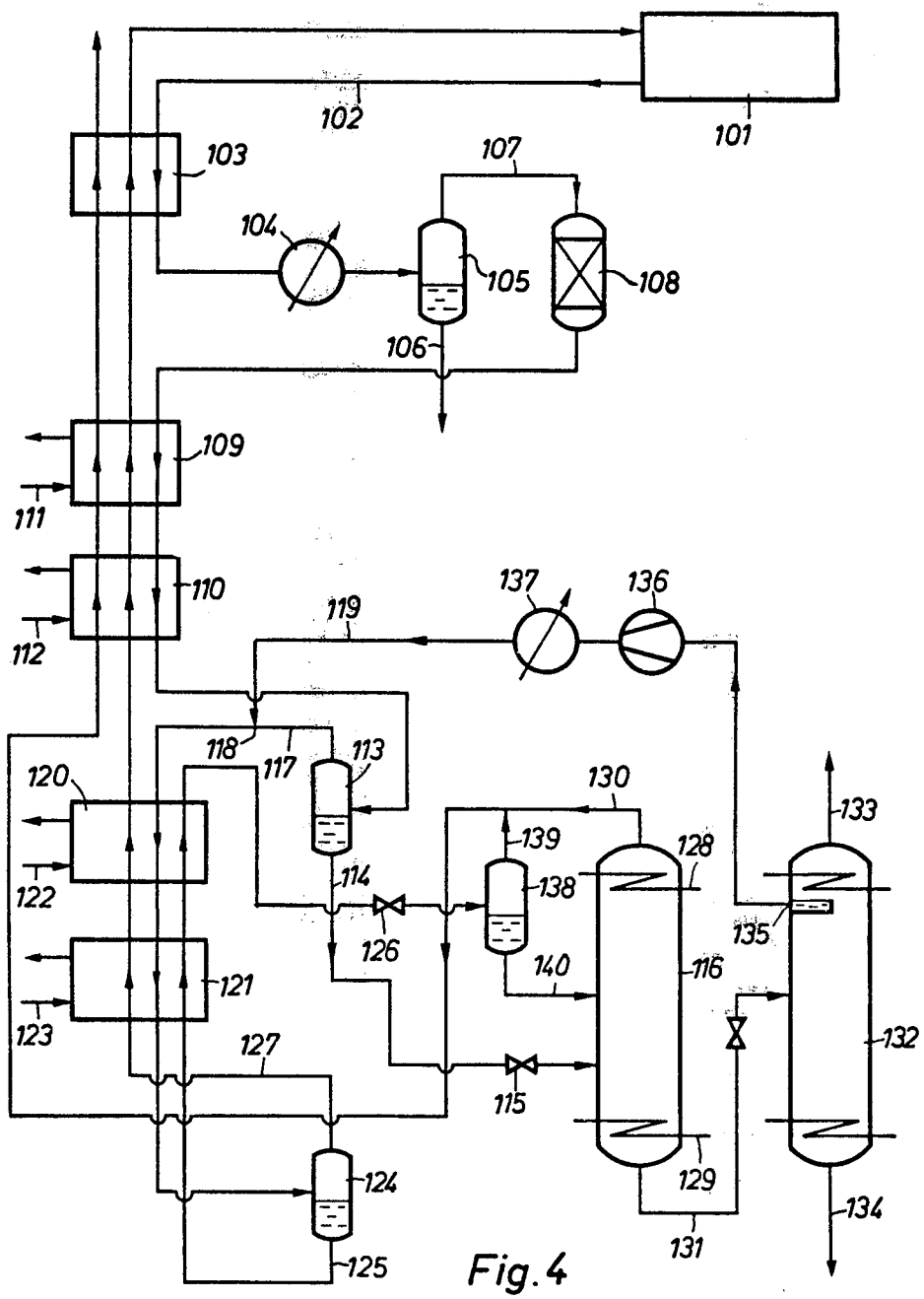

The process illustrated in FIG. 4 is similar to that of FIG. 3. In order to facilitate the fractionation function in the rectifying column 116, this process version provides that only the condensate from separator 124 is introduced into a separator 138 after its partial heating in the heat exchangers 121 and 120 as well as after its expansion in valve 126. During expansion in valve 126 to the column pressure, for example to 35 bar, the largest portion of dissolved hydrogen, nitrogen, and carbon monoxide is degasified from the condensate. This gaseous portion is conducted via conduit 139 directly to conduit 130 and combined with the head product from the rectifying column 116. Merely the condensate obtained in phase separator 138 is fed via conduit 140 into the rectifying column. Due to the thus-attained lower load on the rectifying column 116 by low-boiling components, separation can be accomplished under relatively low pressure.

Figure 5:
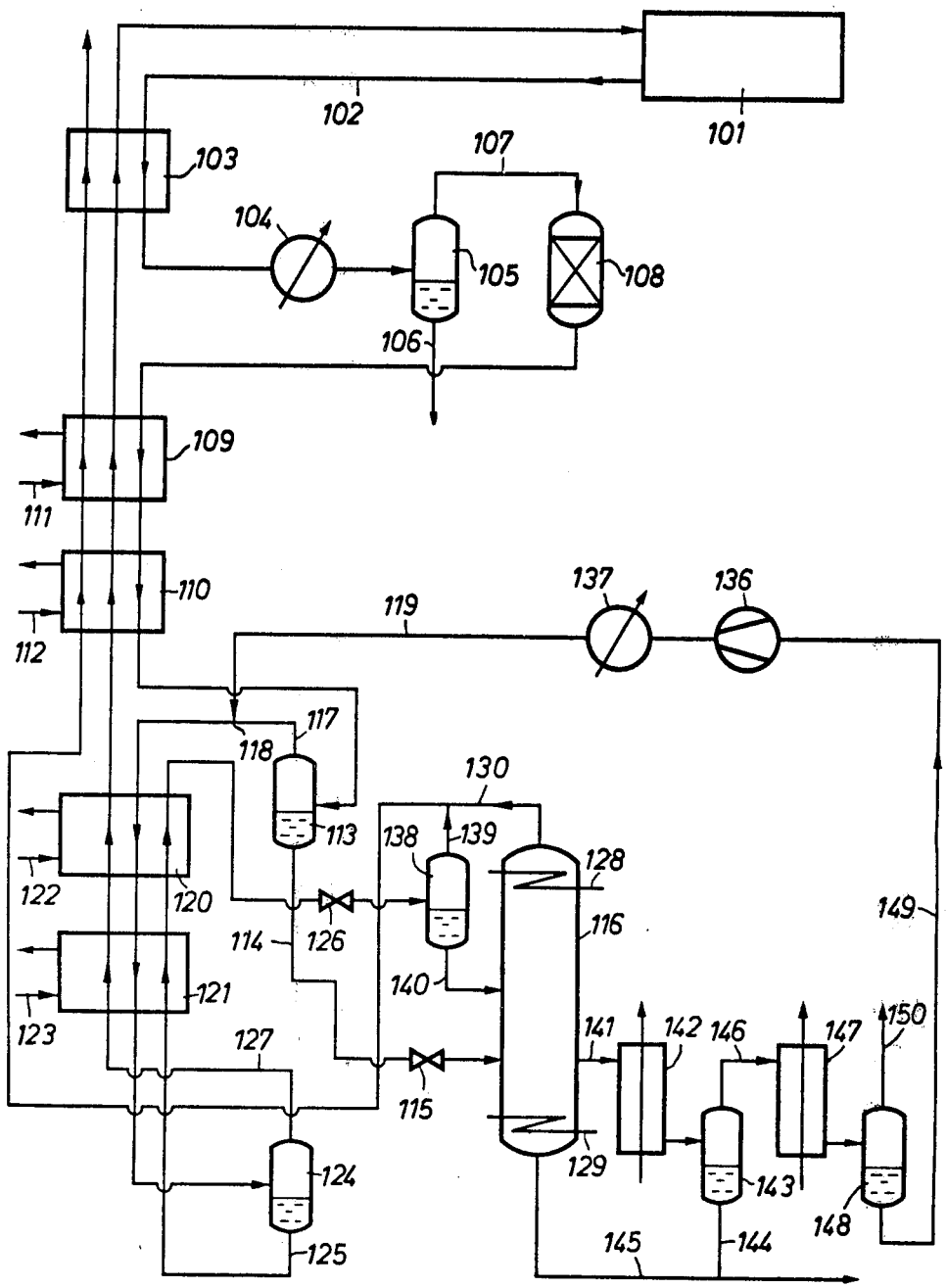

The process according to FIG. 5 shows a different embodiment wherein the rectifying column 132 illustrated in FIGS. 3 and 4 can be omitted. This process version is advantageous if there is no requirement for discharging as the product stream a maximally pure ethane fraction. In this procedure, a $C_2$-enriched gas is withdrawn in the lower column section of the rectifying column 116 via conduit 141. The position of the tap for this fraction is located so that a minimum amount of methane and lower-boiling components is contained in the fraction. From the fraction withdrawn via conduit 141, the largest portion of the components boiling higher than $C_2$-hydrocarbons is then condensed in a first cooling stage 142 which can be operated, for example, at temperatures of $+5°$ C. by cooling against $C_3$-refrigeration, and is separated in separator 143. The condensate from separator 143 is discharged via conduit 144 and removed from the part of the plant here under consideration together with the sump product of the rectifying column withdrawn via conduit 145. The components obtained in the gaseous phase in separator 143 are withdrawn via conduit 146 and further cooled in a second heat exchanger 147 against $C_3$-refrigeration at a temperature of about $-45°$ C. The thus-condensed components are separated in separator 148. This condensate consists essentially of ethane and contains only minor quantities of methane and propane. It is withdrawn via conduit 149 and after being pressurized in pump 136 and cooled in 137 is admixed as ethane cycle at 118 with the hydrogen to be purified. The gaseous fraction in separator 148 contains, in addition to excess ethane, the lighter components of the fraction withdrawn via conduit 141 from the rectifying column 116 and is discharged via conduit 150 from the part of the plant under consideration.

Figure 6:
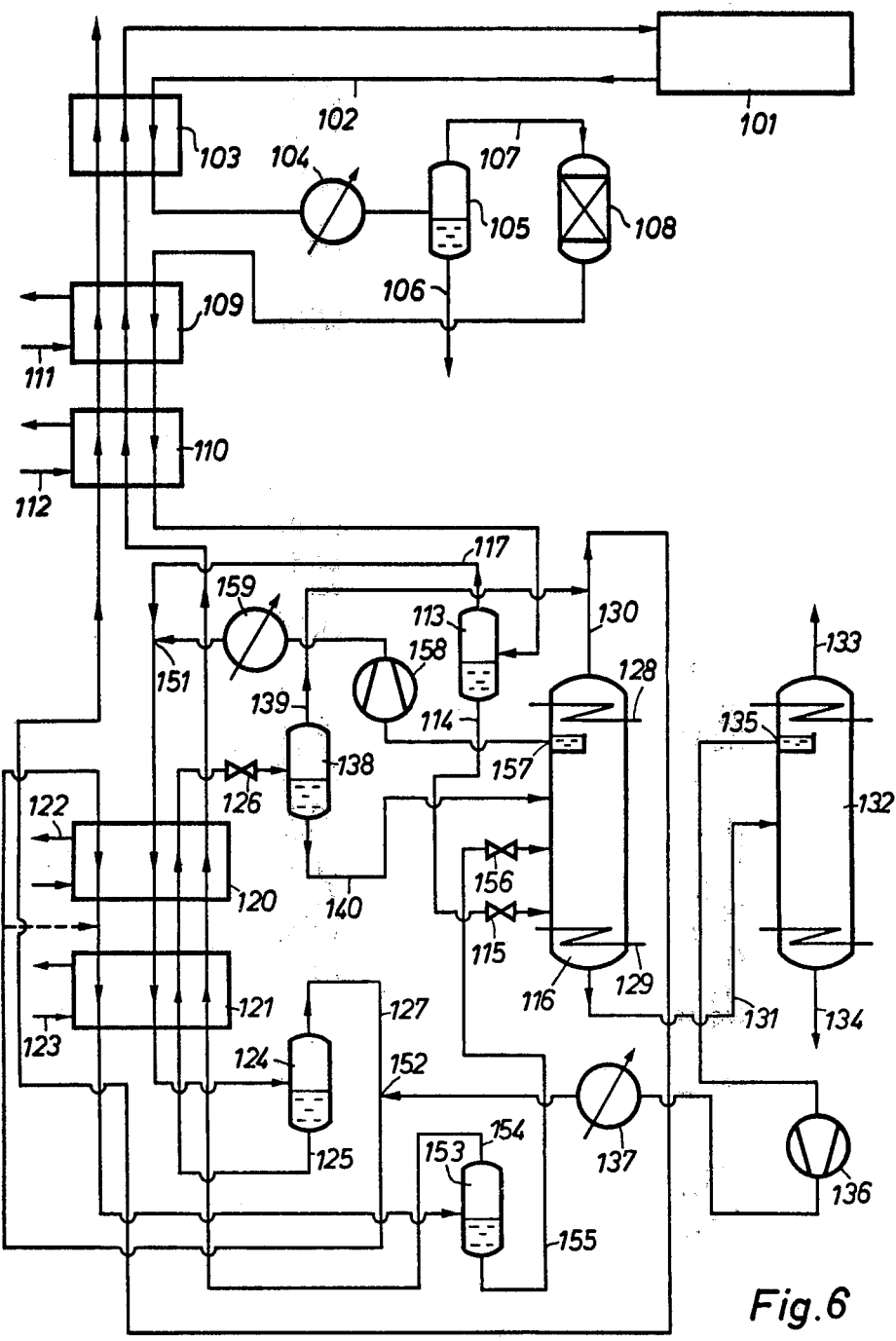

The process illustrated in FIG. 6 differs from that described above essentially in that two different streams are introduced into the hydrogen stream to be purified. Firstly, a methane stream withdrawn from the rectifying column 116 is admixed at 151 to the contaminated hydrogen stream in conduit 117. This methane stream substantially contributes to an especially efficient condensation of the low-boiling components carbon monoxide and nitrogen in heat exchangers 120 and 121. The fraction obtained in separator 124 in the gaseous phase therefore contains, in this embodiment, particularly low concentrations of these impurities, but, in turn, is loaded with an increased methane proportion. Therefore, in order to separate the methane, a further stream is admixed at 152, this time consisting essentially of ethane. In addition, by mixing the two fractions fed from conduit 127 and cooler 137 respectively at point 152, a partial reheating of the hydrogen stream takes place. Therefore a recooling is performed in heat exchangers 120 and 121 or, depending on the mixture temperature, only in heat exchanger 121. As a substitute, cooling can also be conducted in a separate heat exchanger. During recooling, the presence of ethane in the hydrogen stream leads to an extensive condensation of the methane, so that after another phase separation in separator 153, a gaseous fraction remains which is an especially pure hydrogen fraction. This fraction is withdrawn via conduit 154 and, after heating, recycled into the hydrogenation stage 101. The condensate from separator 153 consisting essentially of methane and ethane is withdrawn via conduit 155 and, after expansion on valve 156, is introduced into the rectifying column 116 at a point corresponding to its equilibrium conditions in the column.

Methane derived from admixture to the hydrogen stream at 151 is thus withdrawn at 157 from the upper zone of the rectifying column 116, and after pressure elevation in pump 158 and subsequent cooling in cooler 159, is recycled again into the hydrogen stream at 151 at a temperature of about $-100°$ C.

This invention is particularly applicable to hydrogen streams of the following composition ranges:

| Component | Molar % |
|---|---|
| Hydrogen | 40-95 |
| Methane | 2-20 |
| Ethane | 0.5-5 |
| $C_{3+}$-hydrocarbons | 0.5-5 |
| Nitrogen and Carbon oxides | 0.5-15 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the purification of a hydrogen stream contaminated with at least methane and ethane, said process comprising subjecting the hydrogen stream to multistage partial condensation and separation of the respectively formed condensates, the improvement which comprises subjecting the hydrogen stream to the multistage partial condensation under a pressure above about 100 bar and adjusting said process so as to yield in the final condensate 5-40 molar percent of ethane with a predominating amount of methane thereby ensuring extensive condensation of the methane contained in the hydrogen stream to produce a hydrogen stream of high purity.

2. A process according to claim 1 wherein said adjusting comprises operating the partial condensation stages upstream of the final condensation so as to leave sufficient ethane in the gas entering the final condensation stage to be condensed therein to attain said 5-40 molar percent.

3. A process according to claim 2 wherein said hydrogen stream contains additional contaminant having a freezing point higher than the temperature of the last condensation stage, and wherein the next-to-last condensate separation is conducted at a temperature at which one or more contaminants which would be precipitated as solids at the temperature of the final condensation stage, are condensed out to such an extent that their solubility limit in the final condensation stage is not attained so that solids are not precipitated in the final condensation stage.

4. A process according to claim 1 wherein said adjusting comprises admixing a stream containing $C_2$-hydrocarbon to the hydrogen stream.

5. A process according to claim 4 wherein said hydrogen stream contains contaminant having a higher boiling point than $C_2$-hydrocarbon, and said admixing is conducted after condensation and separation of components boiling higher than said $C_2$-hydrocarbon.

6. A process according to claim 4 wherein the $C_2$-hydrocarbon stream is admixed to the hydrogen stream after cooling of the latter to temperatures of between 170 and 200 K.

7. A process according to claim 4, said admixed stream containing $C_2$-hydrocarbon being a recycle stream derived from a downstream step of separating $C_2$-hydrocarbon from a cold condensate.

8. A process according to claim 7 wherein said downstream step comprises rectification of the condensate.

9. A process according to claim 8 wherein several condensates together including the final condensate are subjected to the rectification.

10. A process according to claim 8 wherein the condensate is expanded prior to the rectification.

11. A process according to claim 1 wherein said hydrogen stream contains additional contaminant having a lower boiling point than methane, and additional contaminant having a higher boiling point than ethane, and condensing and separating said contaminants having a higher boiling point than ethane, and admixing additional methane to resultant hydrogen stream, said methane functioning to condense out a higher amount of said contaminant boiling below methane during a next condensation stage.

12. A process according to claim 11 further comprising cooling said hydrogen stream containing admixed methane, partially condensing and separating condensate from resultant cooled stream, and wherein said adjusting of said process so as to yield in the final condensate 5–40 molar percent of ethane, comprises admixing to resultant cooled gaseous hydrogen stream, a stream containing $C_2$-hydrocarbon.

13. A process according to claim 12 wherein the $C_2$-hydrocarbon stream is admixed to the hydrogen stream after cooling of the latter to temperatures of between 170 and 200 K.

14. A process according to claim 1 wherein the pressure of the hydrogen stream ranges between 200 and 300 bar.

15. A process according to claim 1 wherein the lower boiling contaminant comprises at least one of nitrogen and carbon monoxide.

16. In a process for the purification of a hydrogen stream containing contaminant having a boiling point less than methane, said process comprising subjecting said contaminant to partial condensation and separation, the improvement wherein said process is conducted under pressures above about 100 bar, and methane is added to said hydrogen stream prior to partial condensation thereby effecting a larger degree of condensation of the lower boiling contaminant and resulting in a gaseous stream of hydrogen containing a relatively large amount of methane.

17. A process according to claim 16, further comprising admixing a stream containing essentially $C_2$-hydrocarbons to the gaseous stream of hydrogen remaining, which contains a relatively large amount of methane, after the addition of the methane and the cooling and separating of the lower boiling contaminant condensate thereby ensuring extensive condensation of the methane contained in the hydrogen stream to produce a hydrogen stream of high purity.

18. In a process for the purification of a hydrogen stream containing contaminant having a boiling point higher than $C_2$-hydrocarbons, as well as containing methane and ethane, said process comprising subjecting the hydrogen stream to multistage partial condensation and separation of the respectively formed condensates, the improvement which comprises subjecting the hydrogen stream to the multistage partial condensation under a pressure above about 100 bar, and admixing to the hydrogen stream, after condensation and separation of the components having a boiling point higher than $C_2$-hydrocarbons, a stream which contains $C_2$-hydrocarbons to thereby increase condensation of the methane contained in the hydrogen stream.

* * * * *